United States Patent [19]

Starzewski

[11] Patent Number: 5,670,092
[45] Date of Patent: Sep. 23, 1997

[54] POLARIZING FILM

[75] Inventor: Karl-Heinz Aleksander Ostoja Starzewski, Bad Vilbel, Germany

[73] Assignee: AGFA-Gevaert Aktiengesellschaft, Leverkusen, Germany

[21] Appl. No.: 532,515

[22] Filed: Sep. 22, 1995

[30] Foreign Application Priority Data

Sep. 30, 1994 [DE] Germany .................. 44 34 964.5

[51] Int. Cl.$^6$ .................. F21V 9/14; B29D 7/01
[52] U.S. Cl. .................. 252/585; 264/1.34
[58] Field of Search .................. 252/585; 264/1.34

[56] References Cited

U.S. PATENT DOCUMENTS

| | | | |
|---|---|---|---|
| 4,893,911 | 1/1990 | Ostoja-Starzewski et al. | 350/398 |
| 5,051,286 | 9/1991 | Starzewski | 428/500 |
| 5,326,507 | 7/1994 | Starzewski | 264/1.3 |

FOREIGN PATENT DOCUMENTS

| | | |
|---|---|---|
| 249019 | 12/1987 | European Pat. Off. . |
| 297927 | 1/1989 | European Pat. Off. . |
| 374627 | 6/1990 | European Pat. Off. . |
| 4211779 | 10/1993 | European Pat. Off. . |
| 564925 | 10/1993 | European Pat. Off. . |
| 1569165 | 6/1970 | Germany . |

OTHER PUBLICATIONS

Patent Abstracts of Japan, vol. 4, No. 122, abstract of JP55-77,076 (1980).

*Primary Examiner*—C. H. Kelly
*Attorney, Agent, or Firm*—Sprung Horn Kramer & Woods

[57] ABSTRACT

A polarizing film of improved blocking position based on polyvinyl alcohol which comprises polyacetylene as the light-polarizing substance is obtained if such a film is heated for at least 10 s at a temperature of between 100° C. and 300° C.

10 Claims, No Drawings

POLARIZING FILM

BACKGROUND OF THE INVENTION

The invention relates to a polarizing film having an improved blocking position, in particular in the range from 400 to 450 nm.

It is known to produce polarizing films based on polyvinyl alcohol which comprise at least one dichroic substance. Iodine, certain organic dyestuffs (see EP-A-297 927 and literature mentioned therein) and polyacetylene (EP-B-249 019) are recommended as dichroic substances. So that the films can display their polarizing property, they must be stretched, i.e. extended to a multiple of their original length obtained after casting or extrusion.

Different procedures are used, depending on the dichroic substance. If iodine, which is currently the dichroic substance used the most frequently, is used, the polyvinyl alcohol film which still comprises no dichroic substance is stretched and is then immersed in an aqueous $I_2$/KI solution, from which the iodine diffuses into the film. If organic dyestuffs or polyacetylene are used, the dichroic substance is cast or extruded together with the polyvinyl alcohol and the two are stretched together.

The iodine-containing film used today has two serious disadvantages. It displays in inadequate blocking position in the range from 400 to 450 nm, which means that in the blocking position the film shows not the desired black or dark grey but a blue. This effect is referred to by the technical term "blue leakage". Furthermore, the iodine-containing film is unstable when heated because the iodine molecule can easily sublime out of the film.

Attempts to compensate for the blue leakage of corresponding dyestuffs have not hitherto led to the desired success:

1. Although the "leakage" of the blocked state can be eliminated by non-dichroic yellow dyestuffs (blue/violet absorber), the film is then no longer of neutral colour with respect to non-polarized light and with respect to linearly polarized light. It often has a greenish-tinged effect. Inadequate dichroism and a lack of transparency exists in the wavelength range of the absorber.

2. The use of a second dichroic substance to eliminate the "leakage" also presents problems because, between iodine and this substance, chemical (aggressiveness of iodine) and optical (different transition probabilities) incompatibilities lead to losses in polarizing action, i.e. the difference between "on" and "off" position becomes smaller and the contrast decreases.

Polarizing films of polyvinyl alcohol which comprise polyacetylene as the dichroic substance (POLPAC) have the advantage of being stable and of displaying a transmission of approximately equal strength, and therefore no colour tinge, in the transmission position for linearly polarized light and for non-polarized light via the entire light wavelength range from 400 to 700 nm, which is of interest. However, polarizing films based on POLPAC also show a weakness in the blocking position, i.e. blue leakage, although lower than that of iodine, in the range from 400 to 450 nm. This manifests itself under intense illumination from behind with light with high short-wavelength contents.

SUMMARY OF THE INVENTION

The object of the present invention is to avoid blue leakage without impairing the other good properties of POLPAC film. For this, the degree of polarization of high transmittance POLPAC films in the wavelength range of 400–500 nm was to be increased.

Surprisingly, this object is achieved by subjecting a POLPAC film to a high temperature treatment. The high temperature treatment is preferably carried out for a short time in the absence of oxygen.

The invention therefore relates to a polarizing film based on polyvinyl alcohol which comprises polyacetylene as the light-polarizing substance, characterized in that it has been heated for at least 10 s at a temperature of between 100° C. and 300° C.

DETAILED DESCRIPTION OF THE INVENTION

The duration of the heat treatment is not critical and can be 24 h or more. The heat treatment is expediently interrupted when the effect sought has occurred. To achieve the effect sought, the heat treatment lasts longer the lower the temperature, and vice versa.

Exclusion of oxygen can be achieved by carrying out the heat treatment under an inert gas atmosphere, for example under nitrogen or argon, or, before the heat treatment, providing the polarizing film with a protective layer which is impermeable to oxygen, for example a silicate layer, which is produced by immersion in a water glass solution.

The heat treatment is preferably carded out for 10 s to 60 days at 12° to 270° C., in particular 30 s to 48 h at 140° to 250° C. The effect sought occurs faster, the higher the temperature, and vice versa.

The heat treatment can be carried out continuously by taking off the film from a reel, passing it through a heat treatment zone, cooling it and winding it up again or making it up into individual sheets. The heat treatment can also be carried out discontinuously with reels or sheets.

The initial film is produced by polymerizing acetylene in a solution of polyvinyl alcohol, processing the polyacetylene-containing polyvinyl alcohol solution to films by extrusion or casting and stretching these 4- to 13-fold.

For stretching, the film is clamped such that the ratio $b_o/l_o<3$, preferably <2, wherein $b_o$ is the starting width of the film and $l_o$ is the clamped initial length or the heated stretching gap length.

After the high temperature treatment, the polarizing film can be laminated with other films or glass.

In addition to the described improvement of the optical properties, by the heat treatment, also a dimension stability is reached by the decomposition of the tensions produced by the stretching. This plays a role in the case of thermal or climatic (high air humidity) stress.

The polyacetylene is preferably distributed homogeneously in the film. Its amount is, in particular, 0.1 to 10% by weight of the total polarizing film.

EXAMPLES

Example 1

Preparation of the polyvinyl alcohol/polyacetylene copolymer 1.2 mmol of [NiPh(Ph$_2$PCHCPhO)(i-Pr$_3$PCHPh)] per 100 g of polyvinyl alcohol were stirred into a 7% strength by weight solution of polyvinyl alcohol (vinyl acetate content about 1% by weight) in dry N-methylpyrrolidone at 45° C. with exclusion of air and acetylene was polymerized for 2 minutes. The black-blue polymer was precipitated in methanol, washed thoroughly with methanol and dissolved in water to about 8% strength by weight. (Ph=phenyl; i-Pr=isopropyl).

Example 2

Production of the cast film

16% by weight of glycerol, based on the polymer, were stirred into the aqueous solution from Example 1. The finished casting solution was filtered over a fine filter (10 μm), degassed and then applied at about 40° C. to a polyethylene terephthalate (PET) carrier film in a wet film thickness of about 350 μm.

Example 3

Production of a polyacetylene-containing polarizing film (POLPAC film)

The film, which had been dried to a residual moisture content of about 20% by weight, was peeled off from the carrier film and stretched at about 180° C., the film being clamped for stretching such that the width/length ratio $b_o/l_o$ at the start was 1.5.

The degree of stretching was about 700%. The film thickness after stretching was 10 μm. The broad-band highly polarizing POLPAC film was immersed in tetraethoxysilane for 2 minutes, dried and then glued between 2 cellulose triacetate (CTA) films 100 μm thick. For this, the POLPAC film was placed on a CTA film which was coated with a sodium silicate solution on one side. Thereafter, a second CTA film also coated with sodium silicate solution was placed with the moist silicate layer on the still unprotected side of the POLPAC, and the composite film was pressed together through the rubber rolls of a calender and dried at 95° C. for 5 minutes. Two such crossed polarizers have a deep blue-violet effect under intense illumination from behind with white light which has high short-wavelength contents.

Example 4

High temperature treatment of a silicate-treated, CTA-laminated POLPAC film The polarizing film from Example 3 was heat-treated in air at 200° C. for different lengths of time. The increasing polarizing action in the short wavelength range is shown in Table 1. The measurement range extends from 400 to 800 nm.

TABLE 1

| Treatment time min | $T_{non-pol}$ (at 600 nm) % | P (at 600 nm) % | P ≥ 99% nm | P ≥ 90% nm | P (at 400 nm) % |
|---|---|---|---|---|---|
| 0 | 38 | 99.9 | 520–680 | 460–730 | 71 |
| 5 | 38 | 99.9 | 510–680 | 450–730 | 75 |
| 10 | 38 | 99.9 | 510–680 | 430–730 | 84 |
| 15 | 38 | 99.9 | 500–680 | 400–720 | 91 |
| 20 | 38 | 99.8 | 480–670 | 400–720 | 95 |
| 30 | 36 | 99.6 | 400–660 | 400–710 | 99 |

$T_{non-pol}$ = transmission for non-polarized light;
P = degree of polarization
P ≥ 99% and P ≥ 90% denote the range of visible light in which the degree of polarizing is at least 99 or 90% respectively.

Table 1 shows that the degree of polarization in the range from 400 to 500 nm is improved significantly by the heat treatment, without other properties deteriorating significantly. After the heat treatment, two crossed polarizers have a black effect under intense illumination from behind with white light which has high short-wavelength contents.

Example 5

High temperature treatment of a silicate-treated non-laminated POLPAC film at 250° C.

The CTA covering films were peeled off from a POLPAC film according to Example 3 before drying. A thin, continuous layer of silicate remained on the POLPAC surface. The film was heat-treated in air at 250° C. for 2.5 minutes. The results are shown in Table 2.

TABLE 2

| Treatment time min | $T_{non-pol}$ (at 600 nm) % | P (at 600 nm) % | P ≥ 99% nm | P ≥ 90% nm | P (at 400 nm) % |
|---|---|---|---|---|---|
| 0 | 39 | 99.9 | 500–680 | 440–720 | 79 |
| 2.5 | 39 | 99.9 | 480–670 | 400–700 | 94 |

Example 6

High temperature treatment of a silicate-treated POLPAC film, laminated with CTA, at 160° C.

A POLPAC film according to Example 3 was heat-treated at 160° C. for 16 h. $T_{non-pol}$ (600 nm) was 35% before and after the heat treatment, and P (600 nm) was 99.9%. The wavelength range in which the degree of polarization was at least 99% increased from 520–700 nm to 400–700 nm by the heat treatment.

Example 7

High temperature treatment of a silicate-treated POLPAC film, laminated with CTA, at 120° C.

A POLPAC film according to Example 3 was heat-treated in air at 120° C. for 11 days. $T_{non-pol}$ (600 nm) rose from 34 to 35% and P (600 nm) remained at 99.9%.

The wavelength range in which the degree of polarization was at least 90% increased from 460–740 nm to 400–740 nm.

What is claimed is:

1. A polarizing film of improved blocking position based on polyvinyl alcohol containing polyacetylene as the light-polarizing substance, obtainable by stretching a polarizable film 4- to 13-fold to obtain a polarizing film and thereafter treating the film for from 10 seconds up to 60 days at a temperature of between 100° C. and 300° C. with the exclusion of oxygen wherein the time and temperature of treatment are sufficient to raise the degree of polarization at 400 nm by at least 4%.

2. The polarizing film of claim 1, obtainable by a temperature treatment for 10 s to 60 days at 120° to 270° C.

3. The polarizing film of claim 2, obtainable by a temperature treatment for 30 s to 48 h at 140° to 250° C.

4. The polarizing film of claim 1, which is provided with a silicate layer on both sides to exclude oxygen during the treatment of the film.

5. The polarizing film of claim 1, wherein the polyacetylene content of the polarizing fdm mentioned is 0.1 to 10% by weight.

6. The polarizing film of claim 1, wherein the treatment of the film is for at least 30 seconds.

7. The polarizing film of claim 1, wherein the temperature of treatment is at least 140° C.

8. The polarizing film of claim 1, wherein the time and temperature of treatment are sufficient to raise the degree of polarization of 400 nm by at least 13%.

9. A process for the production of a polarizing film of improved blocking position based on polyvinyl alcohol which comprises polyacetylene as the light-polarizing substance, which comprises stretching a polarizable film 4- to 13- fold to obtain a polarizing film and thereafter treating the film for from 10 seconds up to 60 days at a temperature of between 100° C. and 300° C. with the exclusion of oxygen wherein the time and temperature of treatment are sufficient to raise the degree of polarization at 400 nm by at least 4%.

10. The process according to claim 9, wherein the oxygen is excluded by providing a silicate layer on both sides of the film.

* * * * *